O. SAMPSON.
Corn Planter.
No. 78,237.
Patented May 26, 1868.
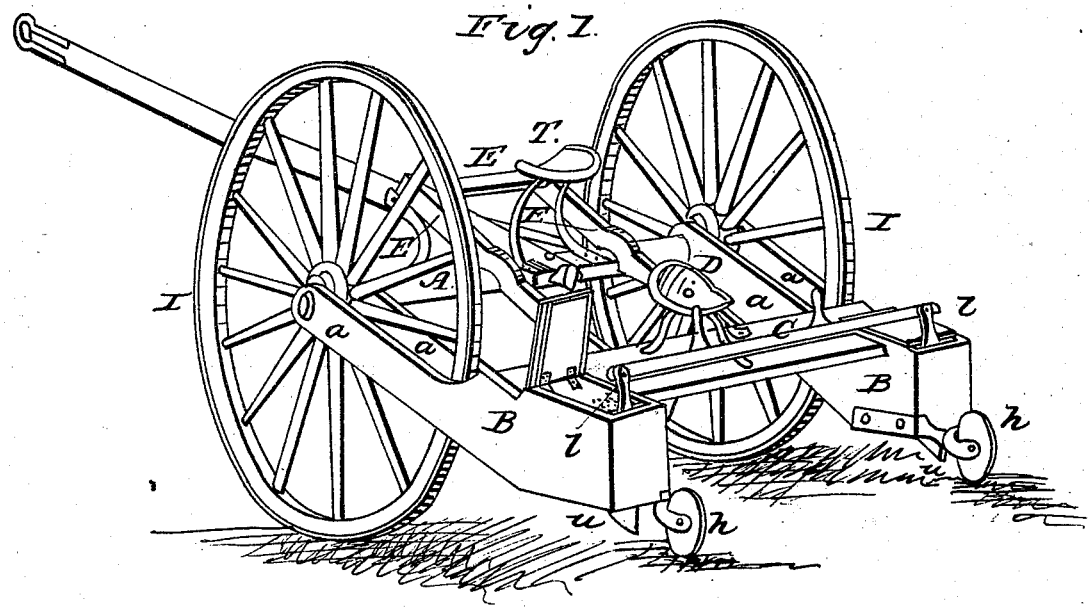
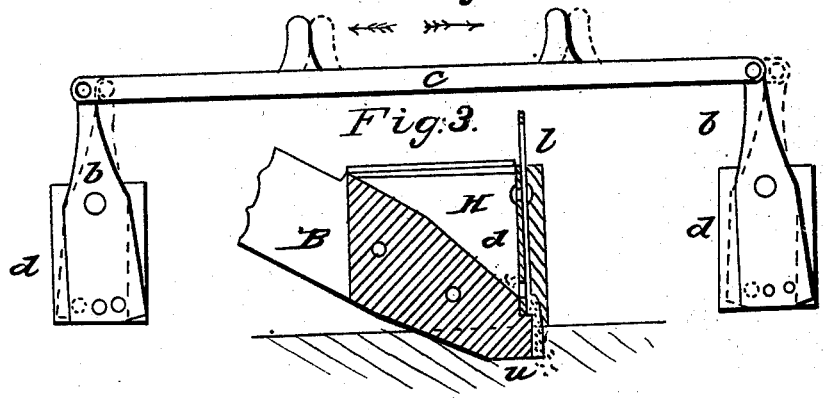
WITNESSES
INVENTOR

United States Patent Office.

ORESTES SAMPSON, OF PETERSBURG, ILLINOIS, ASSIGNOR TO SAMPSON AND FRACKELTON.

Letters Patent No. 78,237, dated May 26, 1868.

IMPROVEMENT IN CORN-PLANTERS.

*The Schedule referred to in these Letters Patent and making part of the same.*

---

TO ALL WHOM IT MAY CONCERN:

Be it known that I, ORESTES SAMPSON, of Petersburg, in the county of Menard, and State of Illinois, have invented certain new and useful Improvements in Corn-Planters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel manner of constructing a machine for planting corn and similar seeds, as will be hereinafter more fully explained.

Figure 1 is a perspective view of the machine complete.

Figures 2 and 3, views of portions shown in detail.

In the construction of this class of machines, it has hitherto been the custom, usually, to construct two separate frames; the front one being mounted on runners, and the rear one on wheels, arranged to follow the runners, and act as coverers for the grain.

In constructing my improved machine, I provide an axle, A, and mount it with wheels, I, as represented in fig. 1. To the axle are secured a tongue and a seat, T, for the driver, as shown.

The planting-mechanism consists of a couple of hoppers, H, with inclined bottoms, as shown in section in fig. 3, with a partition, $d$, placed vertically in it, near the rear end, said partition extending across the hopper H, and being secured in place by resting in grooves in the sides of the hopper. To these partitions or slides $d$ is pivoted an oscillating-valve or seed-slide, $l$, provided with orifices, corresponding with a similar hole in the partition, for regulating the escape of the seed, as is usual in this class of machines. These valves $l$ extend up above the hopper, as shown in fig. 1, and have their upper ends connected by a cross-bar, $c$, provided with handles, as represented in fig. 2.

These hoppers are each formed on the rear end of a bar, B, which is bifurcated at its front end, the two parts, $a$, being pivoted, at their front extremity, on the axle A, on opposite sides of the wheel I, as clearly shown in fig. 1. These bars B are connected, at their rear, by a cross-bar or plank, C, which serves to hold them at proper distances apart, and also forms a platform, on which is located a seat, D, for the dropper, whose business it is to operate the planting-mechanism or valves.

A frame, consisting of two parallel bars, E, united at their front by a cross-bar, F, is secured, at its rear end, to the plank C, and, resting, at or about its centre, on the axle A, extends forward far enough to enable the driver, mounted on seat T, to rest his feet on the front of it, as shown in fig. 1.

The bars B, when attached to the axle, incline downward to the rear; and their under sides, at their rear ends, are cut away, so as to form a flat surface, parallel with the surface of the ground, and which, when the machine is in operation, rests on the ground. Projecting centrally from this under surface is a share, $u$, formed of metal, with its front edge made sharp or wedge-shaped, and its rear portion having an opening or channel extending vertically through it, this opening coming in such a position as to receive the seed as it passes from the hopper, and convey it into the furrow formed by said share as it is drawn along, the weight of the dropper serving to force these shares $u$ into the earth. To each of the bars B is secured a roller or wheel, $h$, in rear of the hopper, as shown in fig. 1, these wheels $h$ being set diagonally to the line of motion of the machine, so that, as the latter moves forward, these wheels, in rolling, shall throw the earth on to the seed deposited in the furrow; and thus cover it. By having the under surfaces of the bars B thus press upon and pass over the ground where the furrow is to be made by the share $u$, the earth is pulverized, and rendered fine, as all lumps and clods are completely crushed, and thus a finely-prepared bed of earth is provided in which to deposit the seed, and by which it is also covered by the rollers $h$.

When it is desired to elevate the shares from the ground, for the purpose of turning at the ends of the rows, or in going to and from the field, the dropper dismounts, when the driver, by pressing with his feet on the cross-bar F, can, at once, raise the rear part of the machine, and balance it on the axle.

The operation is obvious to those familiar with the use of such implements, and, therefore, need not be further described.

Having thus described my invention, what I claim, is—

1. A corn-planter, consisting of an axle mounted on wheels, and having the inclined bars B attached thereto, with their rear ends provided with seed-hoppers H, shares $u$, and covering-wheels $h$, or their equivalents, arranged to operate substantially as described.

2. I also claim the levers E, arranged as described, in combination with the frame carrying the seeding-mechanism, and pivoted to the axle or front frame, for the purpose of elevating the seeding-devices, as described.

3. I claim providing the bars B with a flat surface on their under side, where they rest upon the ground, in front of the shares $u$, for the purpose of pulverizing and smoothing down the earth, to form a seed-bed, as herein set forth.

ORESTES SAMPSON.

Witnesses:
H. H. HOAGLAND,
LUCIAN TERHUNE.